March 22, 1938. O. C. STORK 2,112,181
HOOD SAFETY LATCH
Filed June 16, 1936
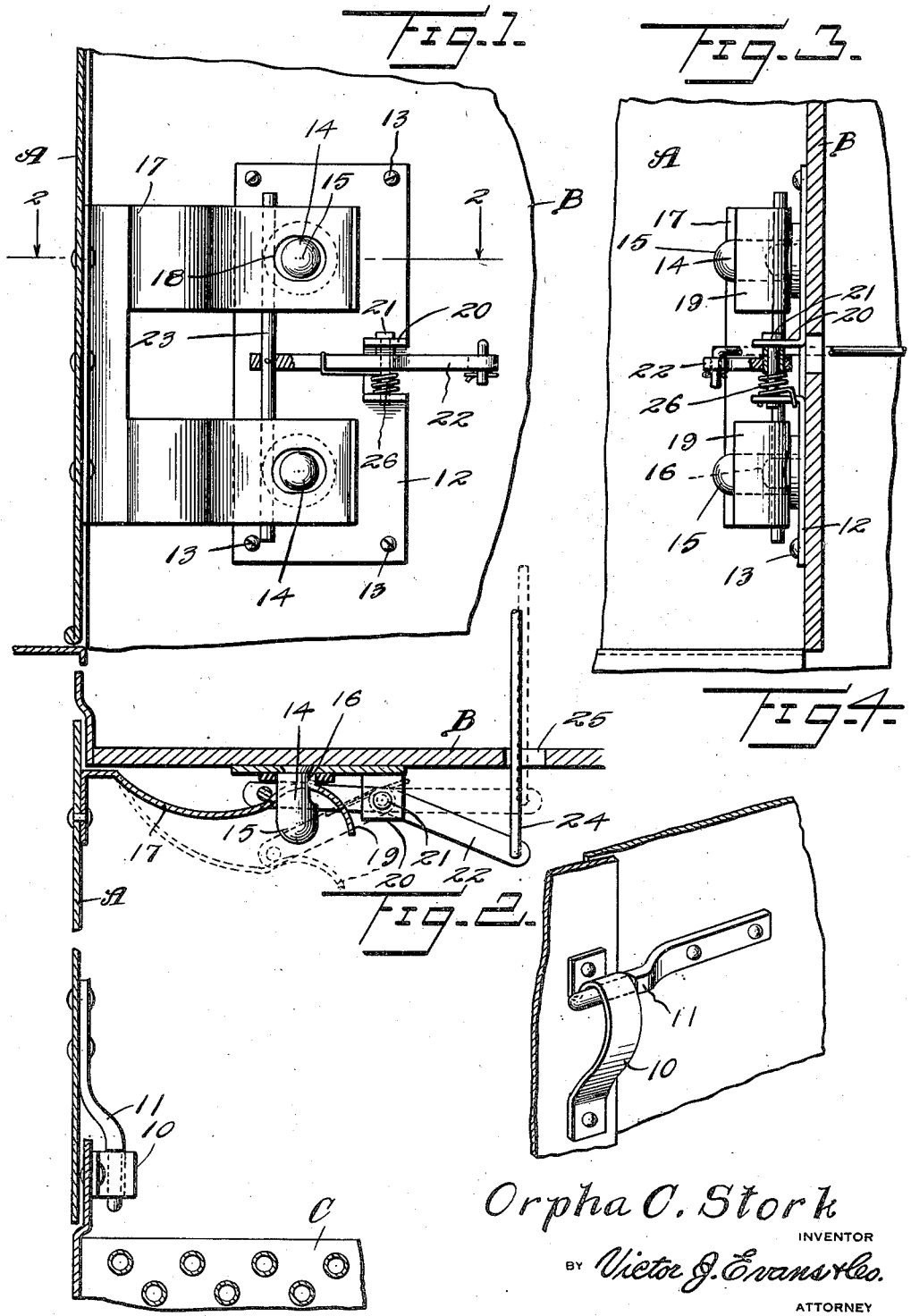
Orpha C. Stork
INVENTOR
BY Victor J. Evans & Co.
ATTORNEY Patented Mar. 22, 1938

2,112,181

UNITED STATES PATENT OFFICE 2,112,181

HOOD SAFETY LATCH

Orpha C. Stork, Flint, Mich.

Application June 16, 1936, Serial No. 85,611

2 Claims. (Cl. 292—254)

The invention relates to a safety latch for automobile hoods.

The primary object of the invention is the provision of a latch of this character, wherein the swinging side section of an automobile hood can be securely fastened in closed position and the same can only be released from within the body of the vehicle, thereby assuring safety to the equipment beneath the hood as the latter can not be opened except from within the body of the automobile.

Another object of the invention is the provision of a latch of this character, wherein the construction thereof, as well as the manner of operation and placement of the same, is novel, the said latch being safe against the opening of the hood from without a motor vehicle and will firmly and securely fasten the hood in closed position with the latching parts concealed from view.

A further object of the invention is the provision of a latch of this character, which is simple in its construction, readily and easily operated, thoroughly reliable and efficient in its working, strong, durable, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a fragmentary vertical transverse sectional view through the hood of a motor vehicle showing the latch constructed in accordance with the invention applied and in latching position.

Figure 2 is a fragmentary sectional view on the line 2—2 of Figure 1 looking in the direction of the arrows.

Figure 3 is a fragmentary vertical longitudinal sectional view through the hood.

Figure 4 is a fragmentary perspective view showing the fastening of the hood at the forward end of the same.

Similar reference characters indicate corresponding parts throughout the several views in the drawing.

Referring to the drawing in detail, A designates generally a portion of the swinging section of an automobile hood and B a portion of the dashboard as built within the body of such vehicle, these parts being of conventional form. At the forward end of the hood A preferably fastened to an extension from the radiator, a portion thereof being indicated at C, is a loop-like keeper 10 for accommodating a fixed latch 11 mounted on the inner side of the swinging section A of the hood at the forward portion thereof. In this manner the forward end of the swinging section of the hood A is latched. At the rear end of the swinging section of the hood is located the latch constituting the present invention and hereinafter fully described.

The latch comprises a base plate 12 which is made secure to the side of the dashboard B facing the radiator C, preferably through the use of screws 13 and this plate has fixed thereto a pair of keeper lugs 14 which are spaced from each other and are formed with outer rounded ends 15 while inwardly from these ends and in one side of each lug is a notch 16 affording a seat for a purpose presently described.

Fixed to the inner face of the swinging section A of the hood at the end portion next to the lugs 14 is a pair of spring latching tongues 17, these having holes 18 for accommodating the lugs 14 so that the said tongues 17 will engage in the seats 16 through spring snapping action. The tongues 17 are formed with the curved ends 19 which ride the lugs 14 when the section A is closed so that such tongues will automatically latch with the lugs 14 and engage in the seats 16 therein for the secure fastening of the hood section A closed at its rear end.

Cut and bent from the plate 12 intermediate of the lugs 14 and offset therefrom laterally are spaced bearing ears 20 for a pivot 21 swingingly supporting a rocking lever 22 which at one end carries a cross head 23 for action against the spring tongues 17 to free the same from the lugs 14 when engaged in the seats 16 therein. This lever 22 at the other end has pivotally connected thereto an actuator rod 24 which is extended in any suitable manner within the body of a motor vehicle through a clearance 25 in the dash B in convenient reach of the operator or driver of the vehicle so that by manual manipulation of this rod 24 the tongues 17 can be unlatched from the lugs 14 to permit the swinging of the section A of the hood to an open position. When the tongues 17 are engaged with the lugs 14 the hood section A is latched and can not be opened from without the same.

About the pivot 21 is a coiled tensioning spring 26 which acts upon the lever 22 to normally hold the same against action upon the tongues 17 and to return the lever to this position when the rod 24 has been pulled upon for the releasing of the tongues 17 from the lugs 14 to free the hood section A or unlatch the same.

What is claimed is:

1. A hood safety latch for motor vehicles having a swinging hood section, comprising a pair of spaced leaf spring snap-acting tongues fixed to the inner side of the swinging section, fixed lugs beneath the hood for the snapping engagement of the tongues therewith, a lever pivotally supported between the said lugs, a cross bar carried by said lever and engageable with the tongues for the release of the same simultaneously with each other from the said lugs, a spring active upon the lever for holding the cross bar retracted from tongue engagement, and a pull rod connected with the lever and extended exteriorly of the hood for manual operation and effecting the unlatching of the tongues from the lugs.

2. A hood safety latch for motor vehicles having a swinging hood section, comprising a pair of spaced leaf spring snap-acting tongues fixed to the inner side of the swinging section, fixed lugs beneath the hood for the snapping engagement of the tongues therewith, a lever pivotally supported between the said lugs, a cross bar carried by said lever and engageable with the tongues for the release of the same simultaneously with each other from the said lugs, a spring active upon the lever for holding the cross bar retracted from tongue engagement, and a pull rod connected with the lever and extended exteriorly of the hood for manual operation and effecting the unlatching of the tongues from the lugs, said swinging section adapted to carry a keeper hook remote from said tongues for releasably engaging a stationary keeper beneath the hood.

ORPHA C. STORK.